(12) United States Patent
Oku

(10) Patent No.: US 6,518,723 B2
(45) Date of Patent: Feb. 11, 2003

(54) H-BRIDGE MOTOR DRIVING CIRCUIT

(75) Inventor: Koichiro Oku, Tokyo (JP)

(73) Assignee: NEC Corporation, Tokyo (JP)

( * ) Notice: Subject to any disclaimer, the term of this patent is extended or adjusted under 35 U.S.C. 154(b) by 8 days.

(21) Appl. No.: 09/906,064

(22) Filed: Jul. 17, 2001

(65) Prior Publication Data

US 2002/0005706 A1 Jan. 17, 2002

(30) Foreign Application Priority Data

Jul. 17, 2000 (JP) .................................... 2000-216071

(51) Int. Cl.$^7$ ................................................ H02P 7/29
(52) U.S. Cl. .................. 318/801; 318/799; 318/800; 318/802; 318/803; 318/700; 388/905; 388/907; 388/907.2; 388/907.5
(58) Field of Search ................................ 318/799, 800, 318/801, 802, 803, 432, 434, 700; 388/905, 907, 907.2, 907.5

(56) References Cited

U.S. PATENT DOCUMENTS

| | | | |
|---|---|---|---|
| 4,581,565 A | * 4/1986 | Van Pelt et al. | 318/294 |
| 4,613,799 A | * 9/1986 | Sumi | 318/314 |
| 4,710,686 A | * 12/1987 | Guzik | 318/293 |
| 4,924,158 A | * 5/1990 | Kelley et al. | 318/434 |
| 5,532,562 A | * 7/1996 | Yasuda | 318/439 |
| 5,760,555 A | * 6/1998 | Yamano et al. | 318/293 |
| 5,990,640 A | * 11/1999 | Dwyer et al. | 318/254 |
| 6,140,795 A | * 10/2000 | Cummins | 318/815 |
| 6,141,494 A | * 10/2000 | Nishino et al. | 388/811 |
| 6,329,777 B1 | * 12/2001 | Itabashi et al. | 318/434 |
| 6,333,617 B1 | * 12/2001 | Itabashi et al. | 318/801 |
| 6,407,520 B1 | * 6/2002 | Kleefeldt et al. | 318/162 |

FOREIGN PATENT DOCUMENTS

| | | | |
|---|---|---|---|
| JP | 2596390 | 1/1997 | |
| JP | 2610069 | 2/1997 | |
| JP | 10-126170 | * 5/1998 | ............ H03F/3/217 |
| JP | 11-41945 | * 2/1999 | ............ H02M/7/48 |
| JP | 2002-034286 | * 1/2002 | ............ H02P/7/29 |

* cited by examiner

*Primary Examiner*—Robert E. Nappi
*Assistant Examiner*—Tyrone Smith
(74) *Attorney, Agent, or Firm*—Young & Thompson

(57) ABSTRACT

An H-bridge motor driving circuit has, between a PWM comparator and a control circuit, first and second frequency dividers for frequency-dividing, by 2, an AND gate, OR gate, and first and second and second inverters. During a first period, the first and second MOS transistors are turned on, and the second and third MOS transistors are turned off, caused a current to flow through a motor. During a next second period, the third and fourth MOS transistors are turned on, and the first and second MOS transistors are turned off, causing a regenerative current to flow through the motor. During a next third period, the MOS transistors are turned on and off in the same manner as during the first period, causing a current to flow through the motor. During a final fourth period, the first and second MOS transistors are turned on, and the third and fourth MOS transistors are turned off, caused a regenerative current to flow through the motor.

1 Claim, 4 Drawing Sheets

H-BRIDGE MOTOR DRIVING CIRCUIT

BACKGROUND OF THE INVENTION

1. Field of the Invention

The present invention relates to an H-bridge motor driving circuit for controlling a DC motor using pulse width modulation (PWM).

2. Description of the Related Art

One general motor driving circuit for controlling a DC motor to rotate selectively in normal and reverse directions is an H-bridge motor driving circuit which has an H-shaped bridge circuit comprising four transistors and a DC motor. The four transistors are turned on and off to energize, de-energize, and rotate the DC motor selectively in the normal and reverse directions.

FIG. 1 of the accompanying drawings shows a typical conventional H-bridge motor driving circuit.

As shown in FIG. 1, the conventional H-bridge motor driving circuit comprises H-bridge output circuit 10, triangular wave oscillator 11, PWM comparator 12, inverter 13, and control circuit 14.

H-bridge output circuit 10 has MOS transistors $Q_1$, $Q_2$ each having a drain connected to the positive terminal of a DC power supply E, a source connected to the circuit board, and a gate supplied with control signals $S_{11}$, $S_{12}$, respectively, for turning on and off MOS transistors $Q_1$, $Q_2$, and MOS transistors $Q_3$, $Q_4$, each having a drain connected to the sources of MOS transistors $Q_1$, $Q_2$, respectively, a source connected to the circuit boards and a ground potential point to which the negative terminal of the DC power supply E is connected, and a gate supplied with control signals $S_{13}$, $S_{14}$, respectively, for turning on and off MOS transistors $Q_3$, $Q_4$. Motor M is connected between the junction between MOS transistors $Q_1$, $Q_3$ and the junction between MOS transistors $Q_2$, $Q_4$. Parasitic diodes $D_1$ through $D_4$ exist at the junctions between the sources of MOS transistors $Q_1$ through $Q_4$, the circuit board, and the drains of MOS transistors $Q_1$ through $Q_4$.

Triangular wave oscillator 11 generates triangular wave signal $S_{21}$.

PWM comparator 12 compares triangular wave signal $S_{21}$ from triangular wave oscillator 11 with constant-level signal $S_{22}$, and outputs PWM pulse signal $S_{23}$.

Inverter 13 inverts pulse signal $S_{23}$ from PWM comparator 12 into pulse signal $S_{24}$.

Control circuit 14 is supplied with pulse signals $S_{23}$, $S_{24}$, power-supply-level signals $S_{25}$, $S_{26}$, and rotation control signal $S_0$, and outputs signals $S_{25}$, $S_{24}$, $S_{26}$, $S_{23}$ as control signals $S_{11}$ through $S_{14}$ for MOS transistors $Q_1$ through $Q_4$.

Operation of the conventional H-bridge motor driving circuit shown in FIG. 1 will be described below with reference to a timing chart of FIG. 4 of the accompanying drawings.

Triangular wave signal $S_{21}$ generated by triangular wave oscillator 11 and constant-level signal $S_{22}$ are supplied to comparator 12, which generates PWM pulse signal $S_{23}$. PWM pulse signal $S_{23}$ is inverted into signal $S_{24}$ by inverter 13. Signals $S_{23}$, $S_{24}$, power-supply-level signal $S_{25}$, and ground-level signal $S_{26}$ are supplied to control circuit 14, and then applied as respective control signals $S_{14}$, $S_{12}$, $S_{11}$, $S_{13}$ to the gates of MOS transistors $Q_4$, $Q_2$, $Q_1$, $Q_3$, respectively. It is assumed that MOS transistors $Q_1$, $Q_4$ are energized, and MOS transistor $Q_4$ is PWM-controlled.

During period $T_1$, signals $S_{23}$, $S_{25}$ are high and MOS transistors $Q_1$, $Q_4$ are turned on, causing a current to flow through motor M. During period $T_2$, signals $S_{24}$, $S_{25}$ are high and MOS transistors $Q_1$, $Q_2$ are turned on, entering a regenerative mode to produce a regenerative current flowing through a loop from motor M to MOS transistor $Q_2$ to MOS transistor $Q_1$ to motor M (in case of an inductive load). In case of a resistive load, the MOS transistors are not conducted.

The conventional H-bridge motor driving circuit described above is disadvantageous in that since MOS transistor $Q_1$ is energized at all times and hence a current flows through MOS transistor $Q_1$ at all times, a large amount of electric power needs to be supplied to the H-bridge motor driving circuit, which generates a large amount of heat and hence suffers poor reliability. The H-bridge motor driving circuit is necessarily of increased cost as it needs a high-performance device such as a low-on-resistance MOSFET or a low-saturation-voltage transistor for reducing the amount of generated heat.

SUMMARY OF THE INVENTION

It is an object of the present invention to provide an H-bridge motor driving circuit which includes a circuit arrangement for distributing an amount of applied electric power among a plurality of transistors to equalize the amounts of heat generated by the transistors.

To achieve the above object, an H-bridge motor driving circuit according to the present invention comprises, connected between a PWM comparator and a control circuit, first and second frequency dividers for frequency-dividing, by 2, an output signal from the PWM comparator with positive-going edges and negative-going edges, respectively, thereof, an AND gate for ANDing an output signal from the first frequency divider, an OR gate for ORing the output signal from the first frequency divider and the output signal from the second frequency divider, and first and second inverters for inverting an output signal from the AND gate and an output signal from the OR gate, respectively.

The control circuit applies an output signal from the first inverter, an output signal from the second inverter, the output signal from the AND gate, and the output signal from the OR gate to the gates of first, second, third, and fourth MOS transistors, respectively.

During a first period, the first and second transistors are turned on, and the second and third transistors are turned off, causing a current to flow through a motor. During a next second period, the third and fourth transistors are turned on, and the first and second transistors are turned off, causing a regenerative current to flow through the motor. During a next third period, the MOS transistors are turned on and off in the same manner as during the first period, causing a current to flow through the motor. During a final fourth period, the first and second transistors are turned on, and the third and fourth transistors are turned off, causing a regenerative current to flow through the motor.

In a regenerative mode, the first and second MOS transistors, and the third and fourth MOS transistors are alternately turned on. Therefore, the amount of applied electric power is distributed among the MOS transistors, thus equalizing the amounts of heat generated by the MOS transistors.

The above and other objects, features, and advantages of the present invention will become apparent from the following description with reference t the accompanying drawing s which illustrate an example of the present invention.

DESCRIPTION OF THE PREFERRED EMBODIMENT

Figure 1:
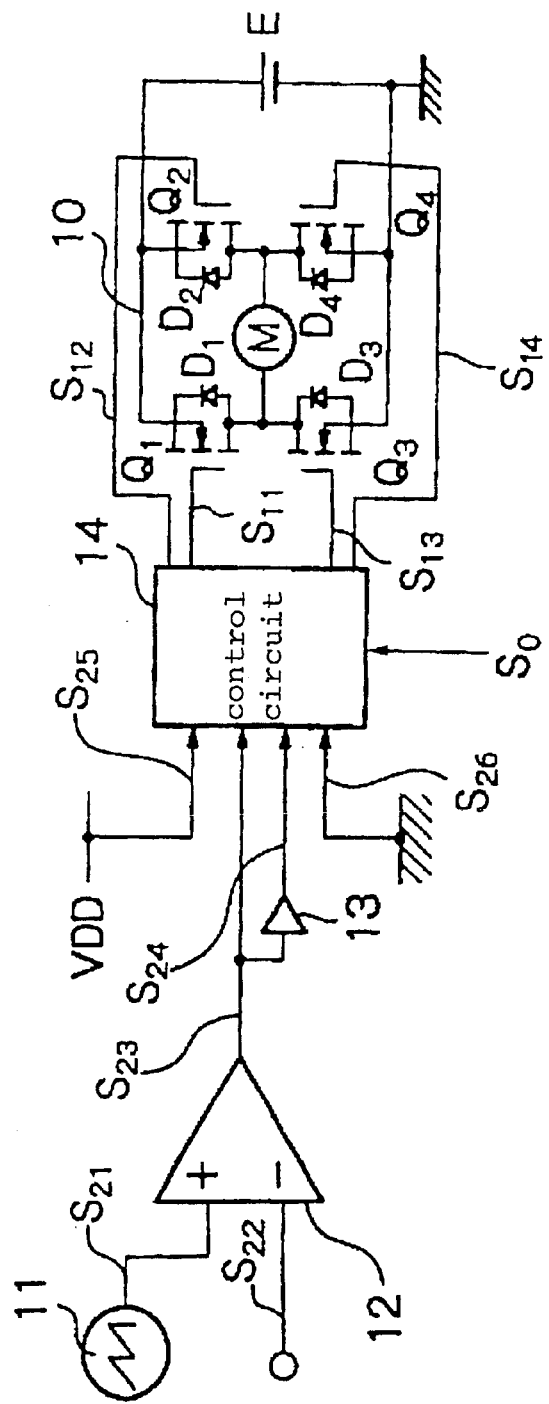
FIG. 1 is a circuit diagram of a conventional H-bridge motor driving circuit.
Figure 2:
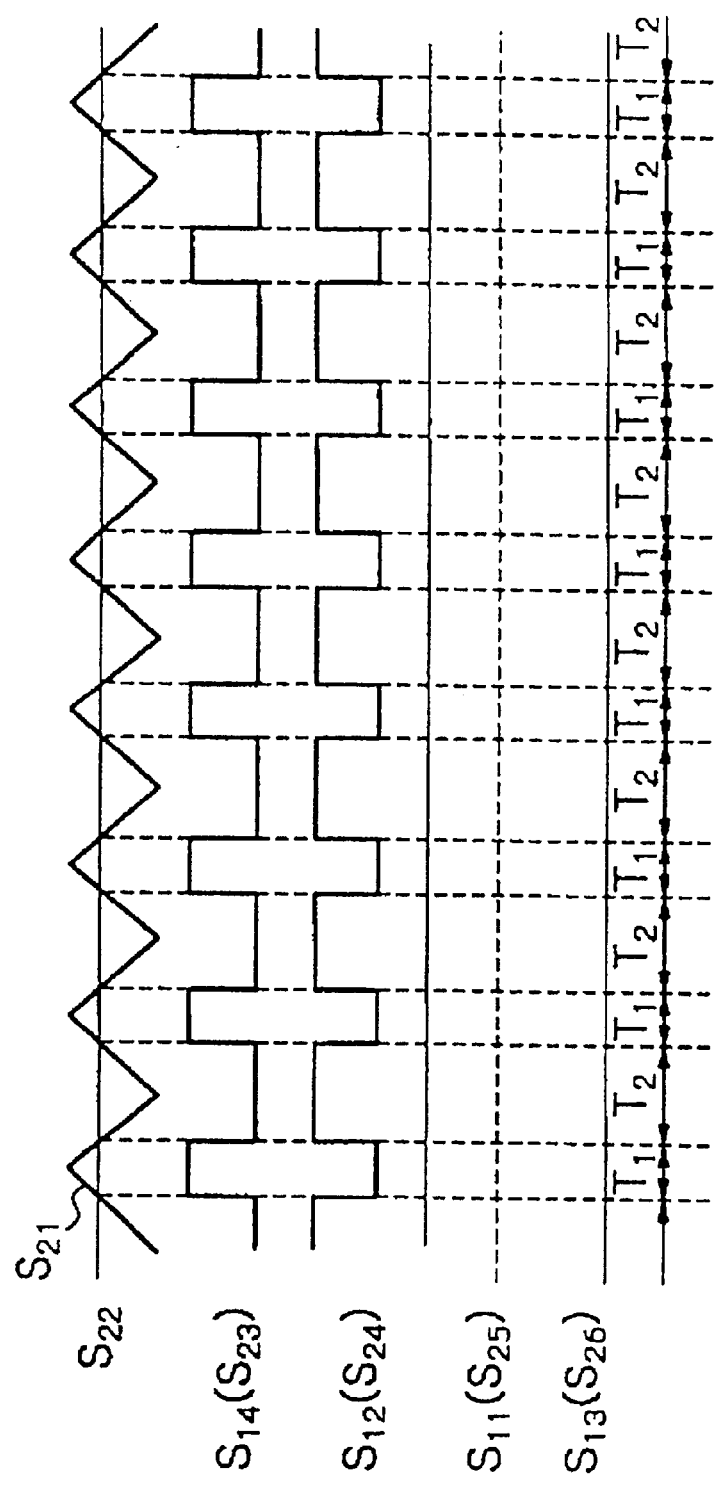
FIG. 2 is a diagram showing waveforms in various portions of the conventional H-bridge motor driving circuit shown in FIG. 1.
Figure 3:
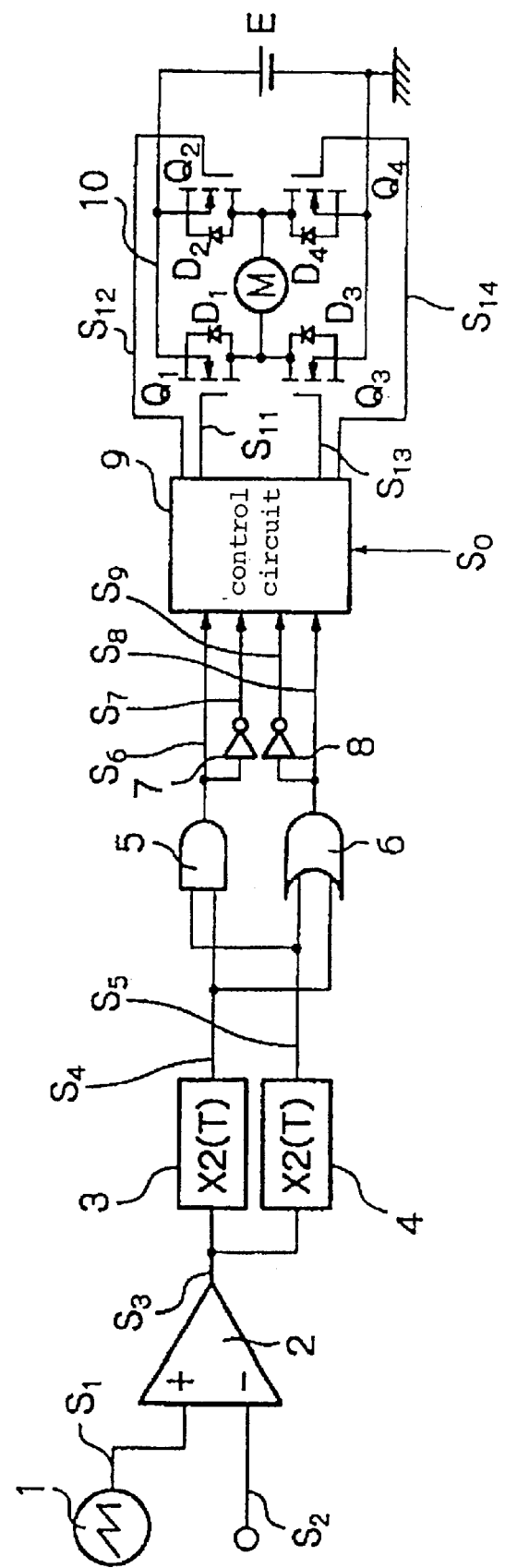
FIG. 3 is a circuit diagram of an H-bridge motor driving circuit according to the present invention.

As shown in FIG. 3, an H-bridge motor driving circuit according to an embodiment of the present invention comprises triangular wave oscillator 1, PWM comparator 2 for comparing triangular wave signal $S_1$ and an input signal $S_2$ with each other, frequency dividers 3, 4 for frequency-dividing, by 2, output signal $S_3$ from PWM comparator 2 with positive-going edges and negative-going edges, respectively, thereof, AND gate 5 and OR gate 6 for ANDing and ORing, respectively, output signals $S_4$, $S_5$ from frequency dividers 3, 4, inverters 7, 8 for inverting output signals $S_6$, $S_8$, respectively, from AND gate 5 and OR gate 6 into respective signals $S_7$, $S_9$, H-bridge output circuit 10, and control circuit 9 for outputting control signals $S_{11}$, $S_{12}$, $S_{13}$, $S_{14}$ from signals $S_6$, $S_7$, $S_8$, $S_9$ and rotation control signal $S_0$ indicative of whether motor M spins in a normal or reverse direction, to turn on and off MOS transistors $Q_1$, $Q_2$, $Q_3$, $Q_4$. H-bridge output circuit 10 is of an arrangement identical to the arrangement of H-bridge output circuit 10 of the conventional H-bridge motor driving circuit shown in FIG. 1.

Figure 4:
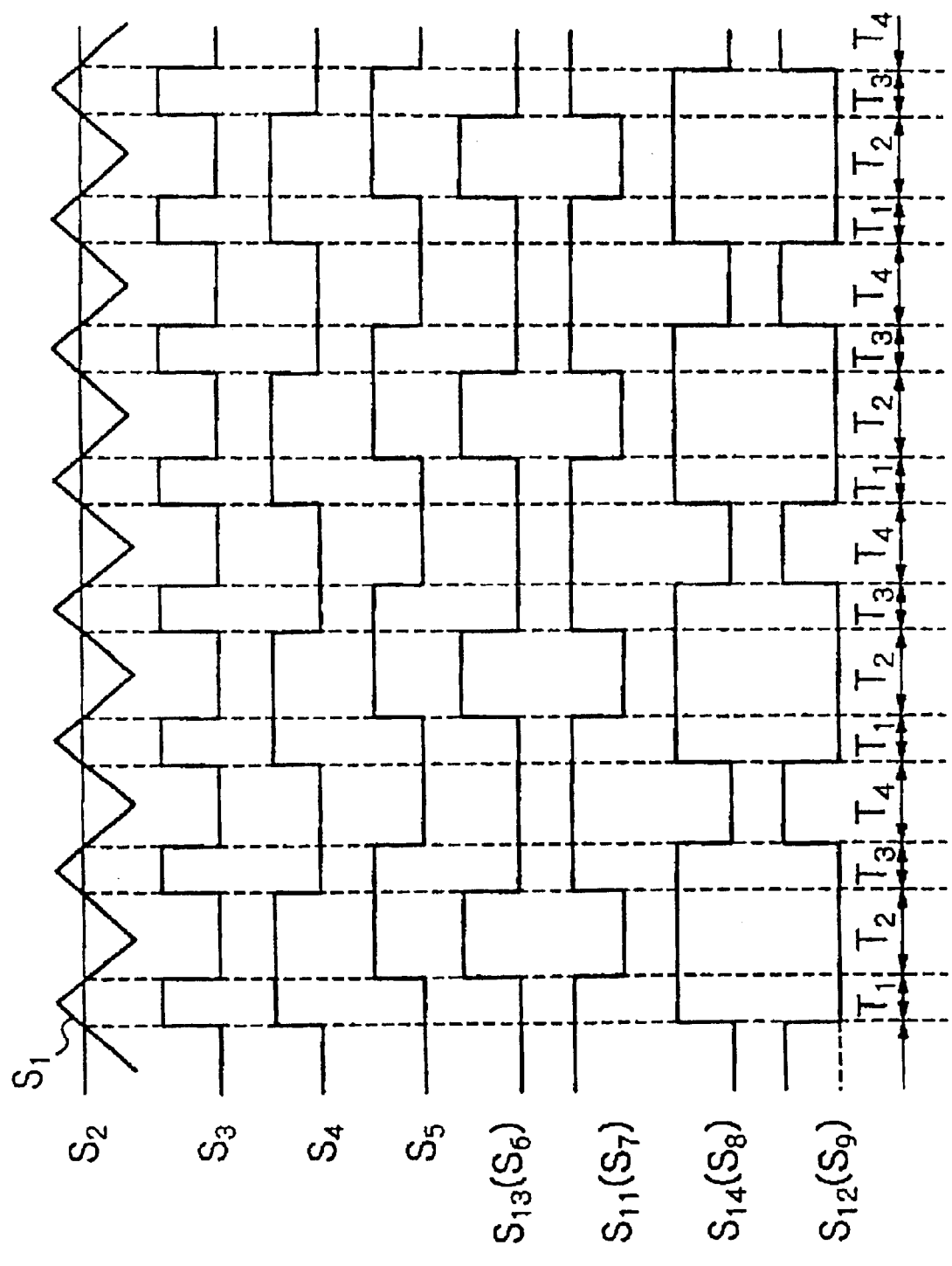
FIG. 4 is a diagram showing waveforms in various portions of the H-bridge motor driving circuit shown in FIG. 3.

Operation of the H-bridge motor driving circuit according to the present embodiment will be described below with reference to FIG. 4. FIG. 4 shows waveforms in various portions of the H-bridge motor driving circuit at the time motor M rotates in the normal direction. When motor M rotates in the reverse direction, signals $S_{13}$, $S_{11}$ and signals $S_{14}$, $S_{12}$ are switched around.

Triangular wave signal $S_1$ generated by triangular wave oscillator 1 and input signal $S_2$ are supplied to PWM comparator 2, which generates PWM pulse signal $S_3$. Frequency dividers 3, 4 frequency-divide, by 2, PWM pulse signal $S_3$ from PWM comparator 2 with positive-going edges and negative-going edges, respectively, thereof. Specifically, frequency divider 3 frequency-divides PWM pulse signal $S_3$ with positive-going edges thereof, producing pulse signal $S_4$, and frequency divider 4 frequency-divides PWM pulse signal $S_3$ with negative-going edges thereof, producing pulse signal $S_5$. These pulse signals $S_4$, $S_5$ have the same frequency as the frequency of triangular wave signal $S_1$ output from triangular wave oscillator 1, and are shifted out of phase with triangular wave signal $S_1$ by the period of the high level of PWM pulse signal $S_3$. Pulse signals $S_4$, $S_5$ output from frequency dividers 3, 4 are applied to AND gate 5 and OR gate 6, respectively, which generate pulse signals $S_6$, $S_8$, respectively. Pulse signals $S_6$, $S_8$ are then inverted by respective inverters 7, 8 into inverted pulse signals $S_7$, $S_9$. Pulse signals $S_6$, $S_7$, $S_8$, $S_9$ are supplied to control circuit 9, which apply them as control signals $S_{13}$, $S_{11}$, $S_{14}$, $S_{12}$ to the gates of MOS transistors $Q_3$, $Q_1$, $Q_4$, $Q_2$, respectively.

It is assumed that MOS transistors $Q_1$, $Q_4$ are energized. With the conventional H-bridge motor driving circuit, only MOS transistor $Q_1$ or only the MOS transistor $Q_4$ is switched to drive motor M according to PWM. According to the present invention, MOS transistors $Q_1$, $Q_4$ are alternatively switched to drive motor M according to PWM. Pulse signal $S_7$ is applied as the gate signal $S_{11}$ for MOS transistor $Q_1$, pulse signal $S_9$ is applied as the gate signal $S_{12}$ for MOS transistor $Q_2$, pulse signal $S_6$ is applied as the gate signal $S_{13}$ for MOS transistor $Q_3$, and pulse signal $S_8$ is applied as the gate signal $S_{14}$ for MOS transistor $Q_4$. One sequence of operating patterns of MOS transistors $Q_3$, $Q_1$, $Q_4$, $Q_2$ is indicated in periods $T_1$ through $T_4$. States of signals and MOS transistors in each of periods $T_1$ through $T_4$ will be described below.

During period $T_1$, pulse signals $S_7$, $S_8$ are high. As a result, MOS transistors $Q_1$, $Q_4$ are turned on, and MOS transistors $Q_2$, $Q_3$ are turned off, causing a current to flow through motor M.

During period $T_2$, pulse signals $S_6$, $S_8$ are high. As a result, MOS transistors $Q_3$, $Q_4$ are turned on, and MOS transistors $Q_1$, $Q_2$ are turned off. At this time, H-bridge output circuit 10 enters a regenerative mode to produce a regenerative current flowing through a loop from motor M to MOS transistor $Q_4$ to MOS transistor $Q_3$ to motor M (in case of an inductive load). In case of a resistive load, the MOS transistors are not conducted.

During period $T_3$, pulse signals $S_7$, $S_8$ are high. As a result, MOS transistors $Q_1$, $Q_2$ are turned on, and MOS transistors $Q_3$, $Q_4$ are turned off. At this time, H-bridge output circuit 10 enters the regenerative mode to produce a regenerative current flowing through a loop from motor M to MOS transistor $Q_2$ to MOS transistor $Q_1$ to motor M (in case of an inductive load). In case of a resistive load, the MOS transistors are not conducted.

While a preferred embodiment of the present invention has been described using specific terms, such description is for illustrative purposes only, and it is to be understood that changes and variations may be made without departing from the spirit or scope of the following claims.

What is claimed is:

1. An H-bridge motor driving circuit comprising:
   an H-bridge output circuit for driving a motor, said H-bridge output circuit including first and second MOS transistors having sources and drains, either of which are connected to a first terminal of a DC power supply, parasitic diodes existing between the sources and the drains and to which a voltage of the DC power supply is applicable in a reverse direction, and gates for being supplied with control signals to control conduction/non-conduction of the first and second MOS transistors, and third and fourth MOS transistors having sources and drains, either of which are connected to the other of the sources and the drains of said first and second MOS transistors and others of which are connected to a second terminal of the DC power supply, parasitic diodes existing between the sources and the drains and to which the voltage of the DC power supply is applicable in a reverse direction, and gates for being supplied with control signals to control conduction/non-conduction of the third and fourth MOS transistors, said motor being connected between a junction between said first and third MOS transistors and a junction between said second and fourth transistors;
   a triangular wave oscillator for generating a triangular wave signal;
   a PWM comparator for comparing said triangular wave signal with a constant-level signal;

first and second frequency dividers, each frequency-dividing, by 2, an output signal from said PWM comparator with positive-going edges and negative-going edges, respectively, thereof;

an AND gate for ANDing an output signal from said first frequency divider and an output signal from said second frequency divider;

an OR gate for ORing the output signal from said first frequency divider and the output signal from said second frequency divider;

first and second inverters, each inverting an output signal from said AND gate and an output signal from said OR gate, respectively; and a control circuit for applying an output signal from said first inverter, an output signal from said second inverter, the output signal from said AND gate, and the output signal from said OR gate to the gates of the first, second, third, and fourth MOS transistors, respectively.

* * * * *